US011194963B1

(12) United States Patent
Schafer et al.

(10) Patent No.: US 11,194,963 B1
(45) Date of Patent: Dec. 7, 2021

(54) AUDITING CITATIONS IN A TEXTUAL DOCUMENT

(71) Applicant: CLEARBRIEF, INC., Seattle, WA (US)

(72) Inventors: Jacqueline Grace Schafer, Seattle, WA (US); Jose Demetrio Saura, Covington, WA (US); Chad Eric Takahashi, Portland, OR (US)

(73) Assignee: CLEARBRIEF, INC., Seattle, WA (US)

( * ) Notice: Subject to any disclaimer, the term of this patent is extended or adjusted under 35 U.S.C. 154(b) by 0 days.

(21) Appl. No.: 17/359,364

(22) Filed: Jun. 25, 2021

Related U.S. Application Data

(60) Provisional application No. 63/151,111, filed on Feb. 19, 2021.

(51) Int. Cl.
G06F 40/205 (2020.01)
G06N 5/04 (2006.01)
G06N 20/00 (2019.01)

(52) U.S. Cl.
CPC ............. G06F 40/205 (2020.01); G06N 5/04 (2013.01); G06N 20/00 (2019.01)

(58) Field of Classification Search
CPC ......... G06F 40/205; G06N 20/00; G06N 5/04
See application file for complete search history.

(56) References Cited

U.S. PATENT DOCUMENTS

| 7,028,259 | B1 | 4/2006 | Jacobson |
| 7,464,025 | B2 | 12/2008 | Humphrey et al. |
| 7,778,954 | B2 | 8/2010 | Rhoads et al. |
| 8,201,085 | B2 | 6/2012 | Rollins et al. |
| 10,489,500 | B2 | 11/2019 | Herr et al. |
| 2018/0276305 | A1* | 9/2018 | Liu ....................... G06F 40/205 |
| 2021/0037293 | A1* | 2/2021 | Aher ................ H04N 21/42203 |
| 2021/0117815 | A1* | 4/2021 | Creed ...................... G06N 3/04 |

* cited by examiner

Primary Examiner — Abul K Azad
(74) Attorney, Agent, or Firm — Makor Law Group, PLLC

(57) ABSTRACT

A computer parses the document to identify a citation, where the citation serves as a pointer to a source reference. The computer determines a location in the document of a textual assertion associated with the citation. The computer calculates relevancy scores between the textual assertion and a corresponding source reference and between the textual assertion and at least one alternate source reference, where the relevancy scores are determined based at least in part on a machine learning algorithm trained with a plurality of training samples. The computer generates a suggested list of at least one of the source references or at least one alternate source reference based on the relevancy scores calculated by the machine learning algorithm and adds a training sample to the plurality of training samples of the machine learning algorithm in response to an action by a user responsive to the suggested list.

23 Claims, 8 Drawing Sheets

AUDITING CITATIONS IN A TEXTUAL DOCUMENT

CROSS-REFERENCE TO RELATED APPLICATIONS

The present application claims the benefit of priority to U.S. Provisional Application No. 63/151,111, filed on Feb. 19, 2021, the contents of which are hereby incorporated by reference in its entirety.

BACKGROUND

The present invention relates, generally, to the field of computing, and more particularly to auditing citations in a document using a machine learning (ML) algorithm.

A citation is a mention within a textual document to a source that is external from the textual document, such as another textual document, a record (e.g., a document that is evidence in a legal matter), a law, or regulation. A citation could be expressed in an abbreviated form that follows certain conventions, such as "JA5" for Judicial Appendix No. 5, "R34" for Record No. 34.

Machine learning (ML) is the study of computer algorithms that improve automatically through experience and by the use of data. Machine learning is seen as a part of artificial intelligence. Machine learning algorithms build a model based on sample data, known as training data or a training set, in order to make predictions or decisions without being explicitly programmed to do so. Machine learning algorithms are used in a wide variety of applications, such as in medicine, computer vision, and natural language processing where it is difficult or unfeasible to develop conventional algorithms to perform the needed tasks. A subset of machine learning is closely related to computational statistics, which focuses on making predictions using computers. The study of mathematical optimization delivers methods, theory and application domains to the field of machine learning.

SUMMARY

According to one embodiment, a method, computer system, and computer program product for verifying citations is provided. The present invention may include a computer to parse the document to identify a citation, where the citation serves as a pointer to a source reference. The computer determines the location in the document of a textual assertion associated with the citation. The computer calculates relevancy scores between the textual assertion and the corresponding source reference and between the textual assertion and at least one alternate source reference, where the relevancy scores are determined based at least in part on a machine learning algorithm trained with a plurality of training samples. The computer generates a suggested list of at least one of the source references or at least one alternate source reference based on the relevancy scores calculated by the machine learning algorithm and adds a training sample to the plurality of training samples of the machine learning algorithm in response to an action by a user responsive to the suggested list.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale, as the illustrations are for clarity in facilitating one skilled in the art in understanding the invention in conjunction with the detailed description. In the drawings.

DETAILED DESCRIPTION

Figure 1:
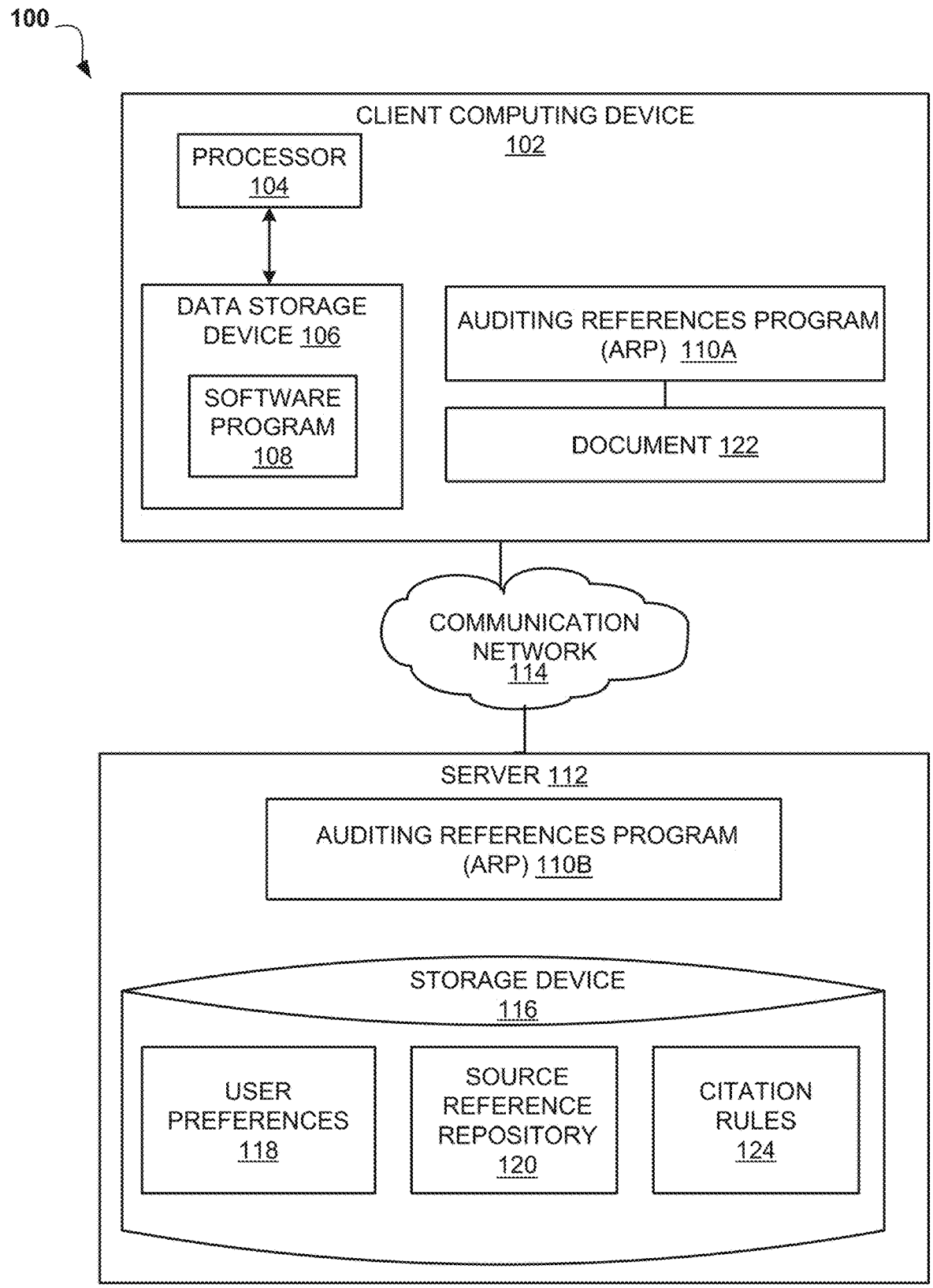
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to Natural Language Processing (NLP) of digital file documents ("documents") such as, for example, legal briefs. It will be appreciated that although the embodiments described herein disclose legal briefs, this is merely an example and other forms of documents are contemplated by embodiments described herein. The documents may take the form of any digital format such as DOC or PDF to name a few and is not limited to field of content. The following described exemplary embodiments provide a system, method, and program product to, among other things, audit and verify citations using a machine learning algorithm, in particular to provide a citation suggestions list.

As previously described, a citation is a mention within a textual document to a source that is external from the textual document, such as another textual document, a record (e.g., a document that is evidence in a legal matter), a law, a regulation, or a website. A citation could be expressed in an abbreviated form that follows certain conventions, such as "JA5" for Judicial Appendix No. 5, "R34" for Record No. 34.

During writing and/or editing a textual document, a user may need to enter citations (e.g., for a legal document: regulation, case law, court record, evidence) relating to an assertion. An assertion is, typically, a text fragment within the textual document. The text fragment comprising one or more sentences supported by one or more external sources.

It is important to accurately cite source documents: record documents, legal sources or external sources. By simply entering citations in an unstructured way, a user may not benefit from advanced word processing functionalities. In addition, users are not provided with: suggestions of citations to other source documents, citation formatting corrections, or warnings about possible overstatements (e.g., where a cited source document may not accurately support an assertion made within a document).

Existing systems do not provide an adequate solution. Traditional legal research software solutions help search publicly available case law documents with keyword or semantic search algorithms. These solutions are generally not integrated into the legal editing software such that the citations to publicly available law can be automatically and consistently identified, and thus require the user to formulate a keyword or semantic search query manually when attempting to analyze public sources. To rely on a user for such manual implementation leads to inaccuracies, errors, and consumes valuable resources. Furthermore, even if such research software is implemented, these solutions fail to recognize all types of citations to publicly available documents (e.g., internet links, articles, and books), and there is no ability for a user to tell the software that a particular piece of text not recognized by the software is in fact a citation. Furthermore, even if such research software is implemented, these solutions fail to provide insights for citing matter-specific citations, such as non-publicly available evidence documents. In other words, existing research software is not technically capable of analyzing legal documents to recognize citations to private source documents or files (including but not limited to, e.g., evidence such as deposition testimony, exhibits with associated metadata, etc.) which may be uploaded to a secure server for private access by parties to a specific matter or case as pdfs, image files, and/or video files. In addition, existing research software has no mechanism to display the original images or renderings of these private source documents. Furthermore, these traditional search software tools only provide responses to questions that are explicitly asked by the user, and don't provide intelligent suggestions to enrich a document with additional citations that the user may not have considered, based on the user's assertion in the document. Finally, for a reviewer of a document (e.g., judge or law clerk reviewing a legal brief), there are no existing technological solution for manually or automatically determining the relevancy of source documents vis-à-vis assertions made by the document drafter who cited such source documents as support for the assertions.

An example system is described below to audit citations using a machine learning algorithm and to provide a list of suggested sources. The system is configured to audit citations by comparing the assertions with the content of source documents, such as record documents and/or legal sources. By doing so, the system performs a verification of the quality and relevance of cited sources to each of the assertions throughout the document (e.g., legal brief, scientific journal, etc). Advantageously, the system can be configured to suggest additional sources to cite to for corresponding assertions in the document. Such suggested additional sources may help bolster support for the associated assertion statement in the document.

The training of the machine learning algorithm may be tedious and time consuming as it requires many samples to train a machine algorithm to reach a desired signal to noise ratio. Some crowd services exist, such as Amazon Mechanical Turks—a crowdsourcing marketplace, to generate training data with human agents in charge of annotating sample training sets. These agents who perform the tasks of annotating training data, lack the skills and expertise to create consistently good quality training data. To reduce training costs, some systems train algorithms based on generic English language training data sets or use pre-trained machine learning algorithms.

However, these pre-trained algorithms or training datasets lack the specificity of the textual document domain language, such as the legal domain language used in legal briefs or other specialized documents. One of the challenges in training an algorithm is to train an algorithm in a specialized domain. This is a tedious task that requires manual annotations to generate training data. Even once a machine learning algorithm is deployed and used, there is a need to re-train the machine algorithm when additional documents are added.

According to an embodiment, the system may be advantageously configured to improve the accuracy over time using specialized training sets. The system can be configured to train a machine learning algorithm, such as a reference entity linking algorithm, using an implicit feedback mechanism from textual documents pertaining to a specialized domain.

An automated citation auditing system and method is described for parsing a textual document and auditing citations, taking into account the machine learning training with feedback provided by the users who are editing and/or viewing the document.

The citation auditing system suggests citations to source documents or passages using a prediction model. The citation auditing system may be integrated into or connected to a word processing system. The citation auditing system may obtain textual inputs directly from a user or may parse a textual document being edited with the document processing system to automatically detect textual inputs. A prediction model can be applied to the textual input and determines semantic similarity measures for automatic generation of citation suggestions across different documents and passages of a database of reference documents. When a paragraph is edited within the document editing system, the prediction model can be employed by the citation auditing system to suggest a citation to a reference document.

The textual documents can be any sort of electronic document comprising words, sentences and paragraphs and citing other textual documents or references, such as scientific publications, legal documents, judicial opinions, case documents, legal briefs. The textual document can be a legal document, such as a contract, an insurance policy claim, a regulatory submission, a legal brief (e.g., a motion, a pleading, a memorandum, an email, a letter, an opinion, or any other document that contains citations or references to support its conclusions).

One example solution for auditing citations in a document is to perform semantic similarity measurement between an assertion (textual input) on one hand, and the content of the cited source reference on the other hand. One example solution for training the algorithm is to use an implicit feedback from users selecting a suggested citation to a source.

Frequently, the user may make various mistakes such as giving a citation to a different source that is unrelated to an assertion, making a typo in a citation, or using an assertion that is not related to the citation. As such, it may be advantageous to implement a system that auditing the citations in the document by parsing a document to identify citations and determine that the citations are related to the assertions using a trained machine learning algorithm that constantly trains itself using user responses.

According to one embodiment, an auditing references program may parse a legal document to identify citations and an assertion associated with each citation. Then the auditing references program may calculate relevancy scores between assertions and source references and between assertions and alternative sources using a machine learning algorithm. The relevancy scores may be used by the auditing references program to generate a suggested list of sources to a user. Based on user responses, the auditing references program may update citations and train the machine learning algorithm to improve performance.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to audit citations in a document using machine learning algorithms.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an auditing references program 110A that controls document 122 and communicates with the server 112 via the communication network 114, in accordance with one embodiment of the invention. Client computing device 102 may be, for example, a mobile device, a netbook, a laptop computer, a tablet computer, a desktop computer, or any type of computing device capable of running a program and accessing a network. As will be discussed with reference to FIG. 4, the client computing device 102 may include internal components 402A and external components 404A, respectively.

The server computer 112 may be a laptop computer, netbook computer, personal computer (PC), a desktop computer, or any programmable electronic device or any network of programmable electronic devices capable of hosting and running an auditing references program 110B and a storage device 116 and communicating with the client computing device 102 via the communication network 114, in accordance with embodiments of the invention. The storage device 116 may host user preferences 118, source reference repository 120 and citation rules 124. As will be discussed with reference to FIG. 4, the server computer 112 may include internal components 402B and external components 404B respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud. The user preferences 118 may be a database that stores preferences of each user of the auditing references program 110A and 110B, such as preferred layout of the GUI and citation rules. The source reference repository 120 may be a documents repository that stores legal sources or other external sources in a natural language that may be relevant to one or more assertions in the document 122. In some embodiments, the source reference repository 120 includes images, PDFs, audio, and/or video files as source references. The images, PDFs, video, and/or audio files may have associated metadata stored in the source reference repository 120 which may be used to match to one or more assertions.

According to the present embodiment, the auditing references program 110A, 110B may be a program that runs partially or parallel to client computing device 102 and server 112 and capable of parsing the document 122, identifying citations and assertions using machine learning algorithm, validating and suggesting alternative citations and based on user feedback updating a training set and retraining the machine learning algorithm in order to improve accuracy. The auditing references method is explained in further detail below with respect to FIG. 2. Embodiments of the invention include a "custom upload" feature of the auditing references program 110A, 110B. The custom upload feature allows a user to manually identify text in the document as a citation. Upon manual identification of specific text within the document as a citation, the machine learning algorithm may learn to recognize such text as a citation in the future. In some examples, the citation may comprise a citation to law or facts. As such, future implementations of the auditing references program 110A, 110B may automatically identify those citations that have been previously identified by the user as a citation.

Although not depicted in FIG. 1, the auditing references program 110A, 110B may be incorporated into legal or natural language writing software such as Microsoft® Word® (Microsoft® Word® and all Microsoft®-based trademarks and logos are trademarks of Microsoft, Inc. or registered trademarks of Microsoft, Inc. and/or its affiliates) by utilizing application programming interface (API) or other integration methods.

Figure 2:
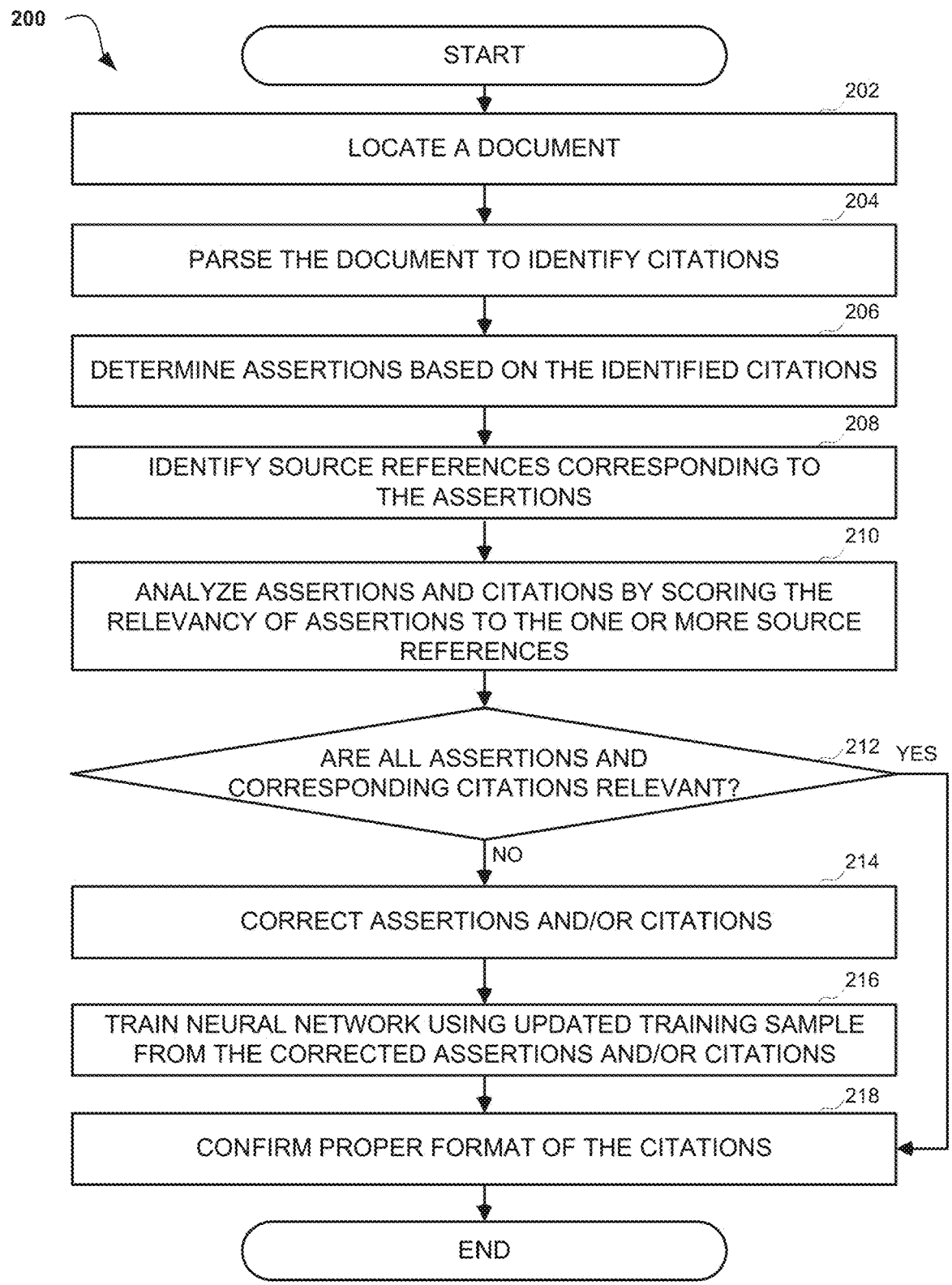
FIG. 2 is an operational flowchart illustrating an auditing references process according to at least one embodiment.

Referring now to FIG. 2, an operational flowchart illustrating an auditing references process 200 is depicted according to at least one embodiment. At 202, the auditing references program (ARP) 110A, 110B locates a document 122. According to an example embodiment, the ARP 110A, 110B may locate the active document using API or request a user to identify or upload the document 122 using GUI.

Next, at 204, the ARP 110A, 110B parses the document 122 to identify citations. As previously mentioned, the citation is a mention or link within a textual document to a source that is external from the textual document, such as another textual document and typically expressed in an abbreviated form that follows certain conventions. According to an example embodiment, the ARP 110A, 110B may parse the document using methods such as OCR (optical character recognition), PCFG (probabilistic context-free grammars) or trained statistical parser based on trained machine learning approach to identify one or more citations. For example, the ARP 110A, 110B may parse legal document for terms commonly used in legal writing such as "id." (typically used to refer to a prior citation) and accurately detect "id." and identify the actual source document that "id." refers to in the writing.

Then, at 206, the ARP 110A, 110B determines assertions based on the identified citations. According to an example embodiment, the ARP 110A, 110B may identify assertion for each citation using word embedding algorithm that converts words, sentences or paragraphs to a multi-dimensional vector, such as Word2Vec or similar deep neural network algorithm. In another embodiment, the ARP 110A, 110B may identify assertions related to each citation by semantically searching for commas, parentheses, a paragraph where the citation is located, or other semantic symbols or identifiers in the document. In further embodiments, the ARP 110A, 110B may identify assertion as one or more sentences in the paragraph where the citation was parsed based on the format of the document. For example, when the document is a legal, persuasive brief, the typical structure may be in the format of issue, rule, application and conclusion (IRAC), thus the rule or application may, be associated by the ARP 110A, 110B as an assertion corresponding to the citation based on identification whether the citation is a citation to the law, regulation or a case decision. The identification of each citation may be based on the structure and format of the citation.

Semantic clues may be used to detect the start and the end of an assertion. The textual document comprises two types of texts: reference text (forming the citations) and non-reference text (not part of a citation). The non-reference text, i.e. each text fragment not used to refer to another source and/or other document, may be parsed to detect assertions associated with citations.

According to a first embodiment, it can be assumed that every block of text is either an assertion or a citation. This is a strong assumption as some text may be neither one or the other. However, such a simple algorithm performs well for the use in the citation auditing system. While any citation might be linked to the assertion (defined as the previous text block), a citation is also an indication of the next assertion.

According to a second embodiment, semantic clues may be used to detect boundaries of an assertion. As described above, the beginning of a citation indicates the end of an associated assertion. The beginning of the assertion can be determined by working backwards from the end until a semantic clue is reached. The semantic clue can be based on the punctuation and more generally the detection of sentences and/or paragraphs. For example, going backward using semantic clues, the beginning of the assertion can be:
1) a number of n sentences (n=1, 2 or 3 for instance) before;
2) a paragraph before; and/or
(3) until the previous citation, whichever comes first.

Figure 6:
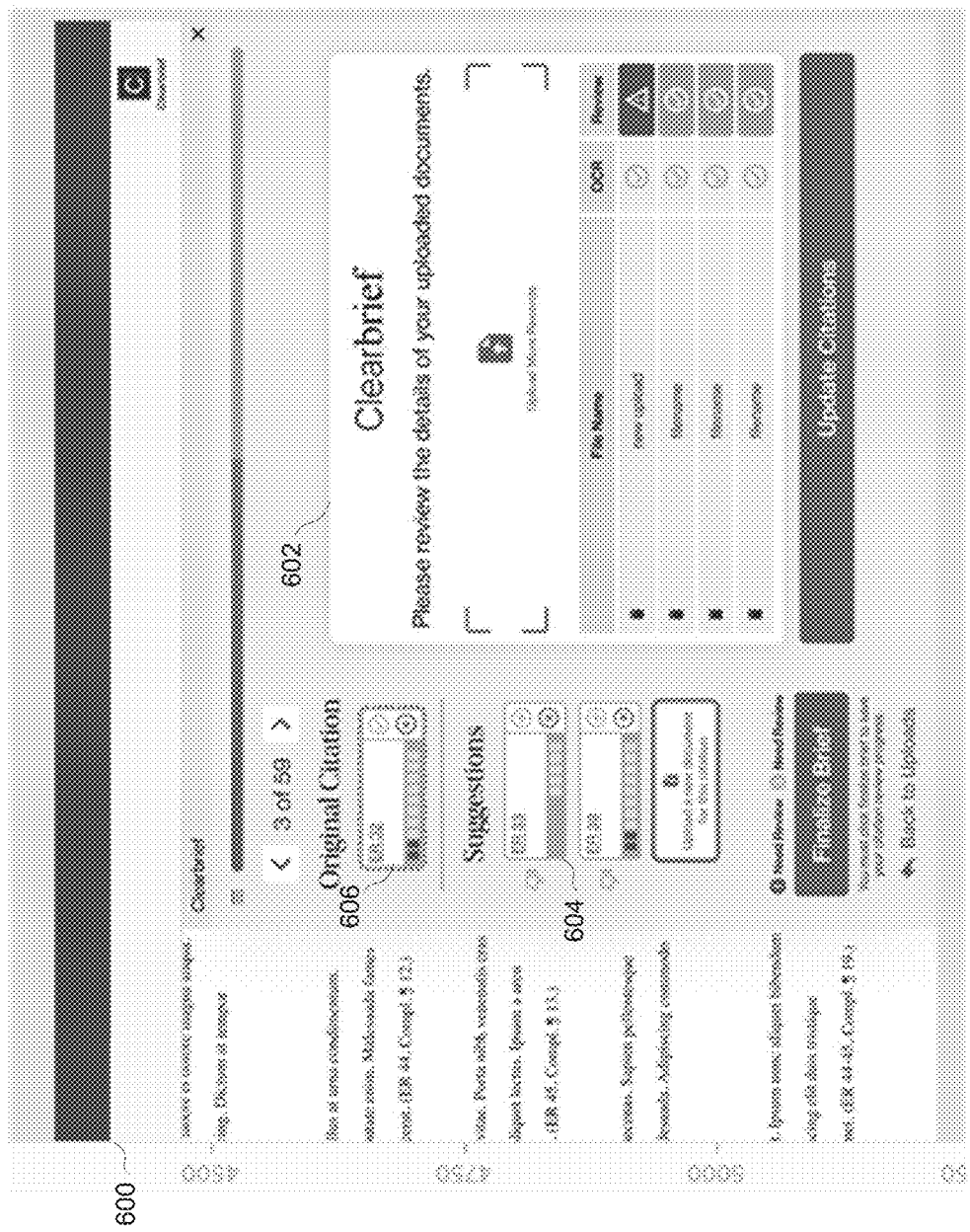
FIG. 6 is a Graphical User Interface (GUI) layout of adding a source document during an auditing references process according to an embodiment of the present invention.

Next, at 208, the ARP 110A, 110B identifies one or more source references corresponding to the respective assertions. According to an example embodiment, the ARP 110A, 110B may identify the source reference by searching a source reference repository 120 or the Internet/Intranet with the corresponding citation. When the exact match between the citation and the name or tags of the source references cannot be identified, the ARP 110A, 110B may search the source reference repository 120 or the Internet/Intranet by parts of the citation, for example, in situations where the citation has a typo. If no source document is found or more than one source documents are identified, the ARP 110A, 110B may request the user to choose one from the identified source references or upload the source reference using GUI, as depicted in FIG. 6. It will be appreciated that the source references and alternate source references mentioned throughout this disclosure may refer to textual documents as well as image files, video files, and/or audio files. For example, the image, video, or audio files may have associated metadata that are identifiable by the ARP 110A, 110B and used to match to citations.

Then, at 210, the ARP 110A, 110B analyzes assertions and citations by scoring the relevancy of assertions to the one or more source references. It will be appreciated that scoring the relevancy of assertions to source references refers to a level of degree the source references disclose content that supports the respective assertions. Support may include having sufficient content in the source reference(s) to provide at least a colorable argument or assertion in view of the source reference content. According to an example embodiment, the ARP 110A, 110B may use a machine learning algorithm to compare the assertion to the source reference identified by the citation. For example, the assertion may be converted to a multi-dimensional vector and compared to a multi-dimensional vectors extracted from the paragraphs of the source reference. According to one of the embodiments, the ARP 110A, 110B may compare the multi-dimensional vectors using linear algebra methods such as cosine similarity, comparing vector distances or using specially trained neural network trained for identifying similar vectors. In another embodiment, the ARP 110A, 110B may extract topics of the assertion using NLP and compare the topic to the one or more topics of the source documents. In one embodiment, the source reference comprises an image, video, or audio file having associated metadata that are identifiable and searchable by the ARP 110A, 110B. The source reference metadata may be used by the ARP 110A, 110B to score the relevancy of the assertion to the source reference. The assertion may be compared to each portion of the associated source reference metadata.

In a particular example, the assertion is compared to each portion (paragraph or group of sentences) of:
    each record (for a citation to the record type), and
    each law (for a citation to the law type).

The comparison can be a semantic similarity measure performed for instance with a distance calculation between vector representations (embeddings) of the assertion and the source reference (record, law, court opinion, etc.). Specifically, the assertion text may be vectorized (outputs of the deep learning model for the assertion text). Additionally, the source reference may be broken down into paragraphs/sentences and vectorized (outputs of the deep learning model for the record).

Next, at 212, the ARP 110A, 110B determines whether all assertions and corresponding source references are relevant. In other words, the ARP 110A, 110B determines whether and to what degree the source references disclose content that supports the respective assertions. According to one implementation, the determination may be made by comparing the relevancy score (from step 210) to a threshold value set by a user. The threshold value may be a defined level of source content relevancy which the user contends is sufficient to support the assertion in the document. In other embodiments, the threshold value is auto-generated by the ARP 110A, 110B and may be adjusted by a user. For example, if the ARP 110A, 110B determines the score is above the threshold value (step 212, "YES" branch), the ARP 110A, 110B may continue to step 220 to confirm proper format of the citation. If the ARP 110A, 110B determines the score is below the threshold value (step 212, "NO" branch), the ARP 110A, 110B may continue to step 214 to correct assertions and citations.

Figure 5:
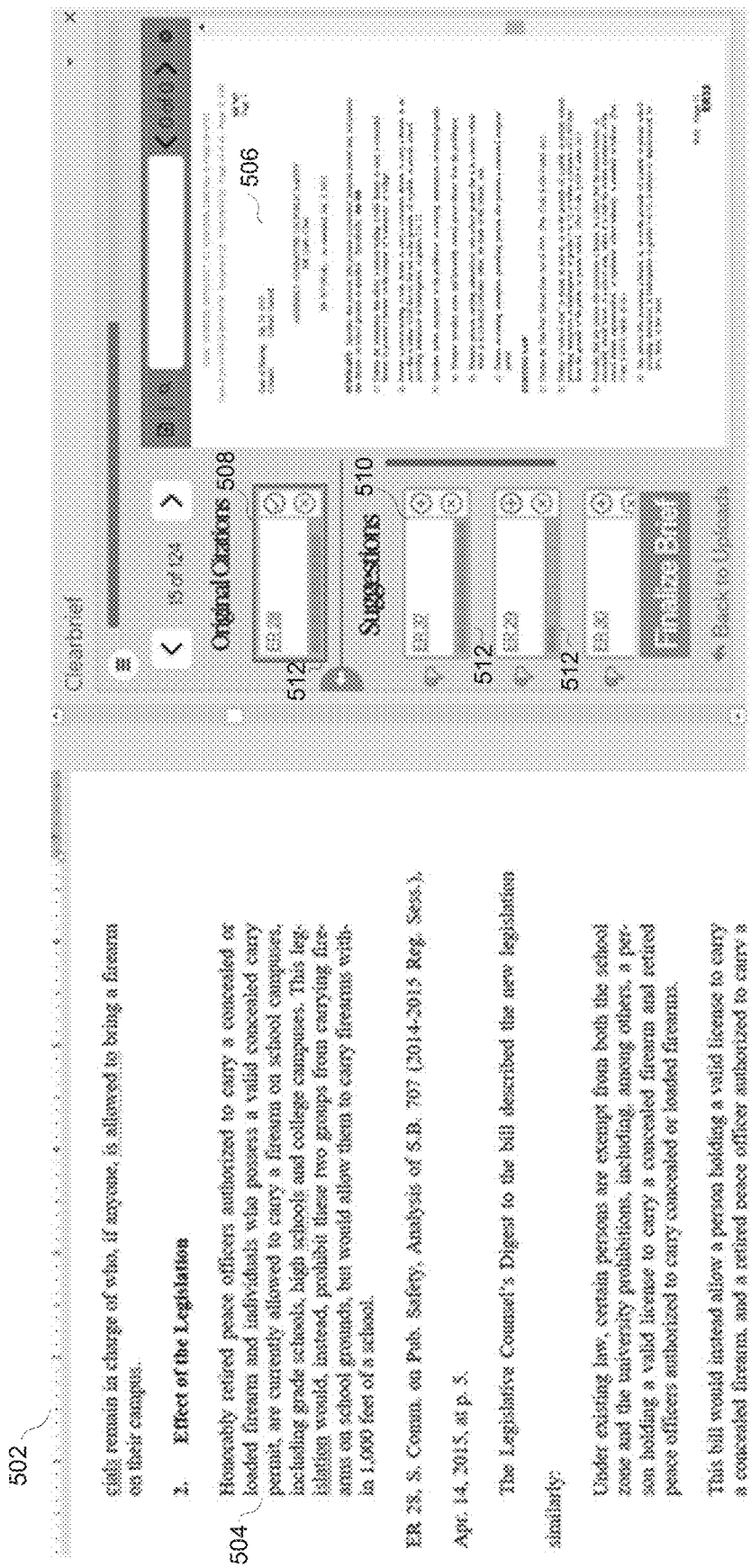
FIG. 5 is a Graphical User Interface (GUI) layout of auditing references process according to an embodiment of the present invention.

Then, at 214, the ARP 110A, 110B corrects assertions and citations. According to an example embodiment, the ARP 110A, 110B may search for alternative source references, relative an assertion, that have a relevancy score above the threshold value or a relevancy score above the current relevancy score value and display the alternative source refences to a user using a GUI as depicted in FIG. 5. Alternatively and/or additionally, at 214, the ARP 110A, 110B may revise the assertion text to better reflect the content of the originally cited source reference and/or the alternative source reference.

Next, at 216, according to an example embodiment, the ARP 110A, 110B may add a corrected assertion and/or citation to a sample list and retrain the neural network of step 210 using the updated sample list. Then, at 218, the ARP 110A, 110B confirms proper format of the citations. According to an example embodiment, the ARP 110A, 110B may format all of the identified citations based on the citation rules 124. For example, the citation rules may be according to a Bluebook convention rules. In another example, the ARP 110A, 110B may analyze the citations of the document 122 and format nonconforming citations according to a majority citations of the document. In further embodiment, the ARP 110A, 110B may store different rules based on user preferences 118 and convert the citations based on the preferences.

Figure 3:
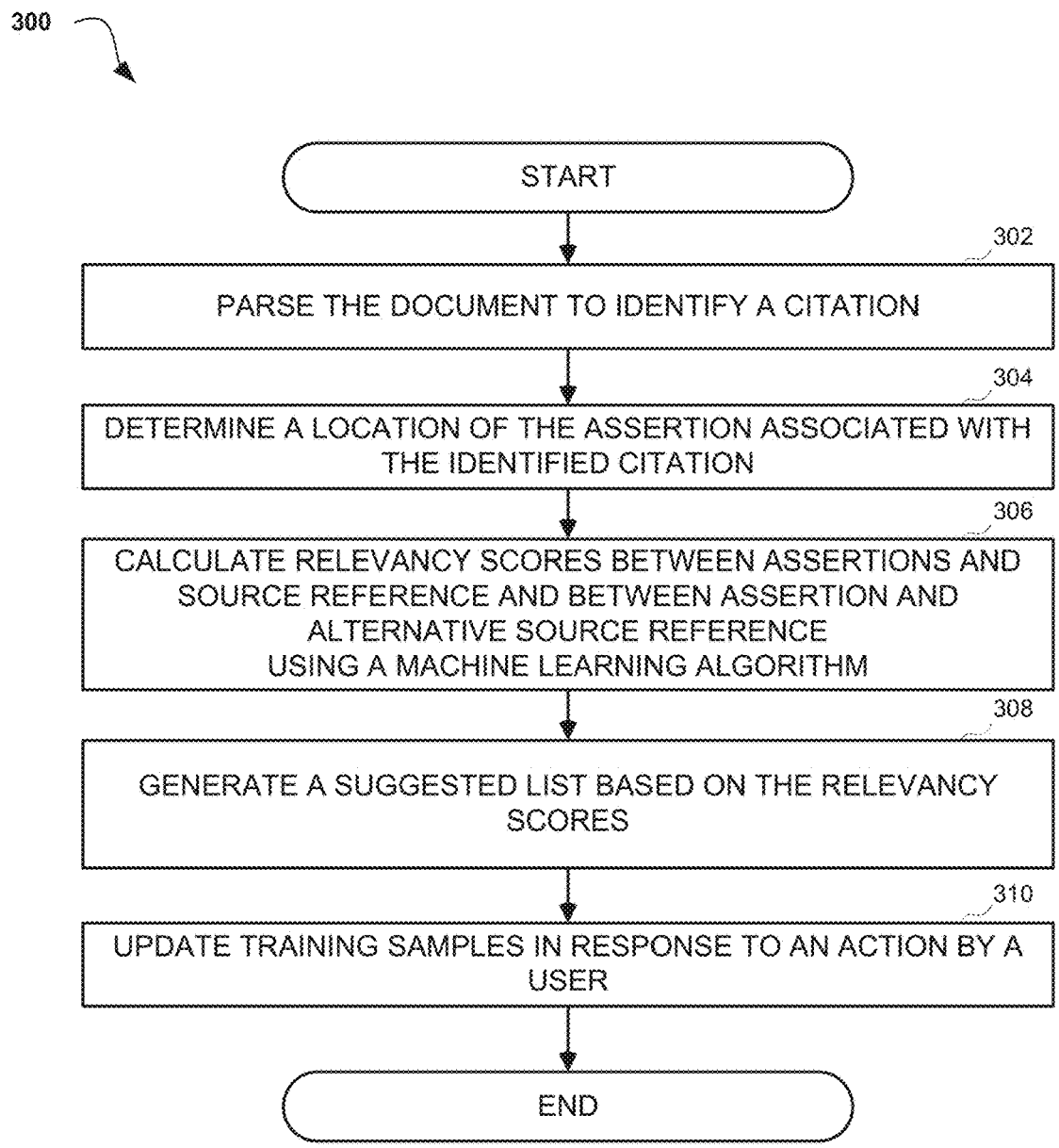
FIG. 3 is an operational flowchart illustrating a preferred embodiment of the auditing references process.

Referring now to FIG. 3, an operational flowchart illustrating an example of auditing references 300 according to at least one embodiment. At 302, the auditing references program (ARP) 110A, 110B parses the document to identify a citation. According to an example embodiment, the ARP 110A, 110B may parse the document 122 using a rule-based natural language parser that was modified to identify citations. The ARP 110A, 110B may identify a source reference associated with the citation and set the citation as a pointer to the source reference by searching a source reference repository or the Internet. In further embodiments, the ARP 110A, 110B may save results of the parsing into a structured file for further processing, where the structured file includes citation categories identifiable with a rule-based text processing to extract known patterns with a text tokenization algorithm.

Then, at 304, the ARP 110A, 110B determines a location of the assertion associated with the identified citation. According to an example embodiment, the ARP 110A, 110B may apply a rule-based text processing to identify citations with a text tokenization algorithm or by using a rule-based text processing.

As mentioned above, semantic clues may be used to detect the start and the end of an assertion. The textual document comprises two types of texts: reference text (forming the citations) and non-reference text (not part of a citation). The non-reference text, i.e. each text fragment not used to refer to another source and/or other document, may be parsed to detect assertions associated with citations.

According to a first embodiment, it can be assumed that every block of text is either an assertion or a citation. This is a strong assumption as some text may be neither one or the other. However, such a simple algorithm performs well for the use in the citation auditing system. While any citation might be linked to the assertion (defined as the previous text block), a citation is also an indication of the next assertion.

According to a second embodiment, semantic clues may be used to detect boundaries of an assertion. As described above, the beginning of a citation indicates the end of an associated assertion. The beginning of the assertion can be determined by working backwards from the end until a semantic clue is reached. The semantic clue can be based on the punctuation and more generally the detection of sentences and/or paragraphs. For example, going backward using semantic clues, the beginning of the assertion can be:

(1) a number of n sentences (n=1, 2 or 3 for instance) before;
(2) a paragraph before; and/or
(3) until the previous citation, whichever comes first.

Next, at 306, the ARP 110A, 110B calculates relevancy scores between assertions and source reference and between assertion and alternative source reference using a machine learning algorithm. According to an example embodiment, the ARP 110A, 110B may calculate the relevancy scores based on a machine learning algorithm trained with a plurality of training samples and/or may be combined with statistical analysis methods. The machine learning algorithm may be a trained binary classifier that determines whether the textual assertion is supported by the source reference or at least one alternate source reference. The alternate source reference may be source references stored in the source reference repository 120 and was not cited to in the original document by the drafter of the document. According to an example embodiment, the ARP 110A, 110B may perform a semantic similarity measurement with a distance calculation between vector representations of the textual assertion and one or more of vector representations of the source reference or the at least one source reference to calculate the relevancy scores.

In particular, to generate the relevancy scores, one or more distance ("likeness") calculations may be performed between each assertion and each candidate record or source reference. For example, each assertion can be converted into an assertion vector. Similarly, each candidate record or source reference can be broken down into multiple text fragments. Then, a comparison may be implemented between the assertion vector and one or more record vectors of a source reference.

The distance calculation can be based on a cosine similarity or equivalent using as input an assertion vector on one hand, and a candidate vector on the other hand. Alternatively, the distance calculation can be based on a deep machine learning model that learns its own distance function.

By comparing the respective outputs of the machine learning model, a numerical value is extracted from the comparison between the assertion and each fragment of the source reference under analysis. Fragments of the source reference with high similarity score with the assertion are selected. The output used by the model can correspond to a probability and can be interpreted as a confidence score or relevancy score.

For instance, an output value (e.g., 0.85) superior or equal to a threshold (e.g., 0.5) means "Yes relevant". Conversely, an output value lower than the threshold means "No, not relevant". While the threshold value is used to determine a "Yes" or a "No", the higher the value between 0 and 1, the more confident the unit or source reference in question is a good citation.

In another embodiment, all distance calculations can be aggregated together to form a composite score. With a composite score, the higher the value the more distant (i.e., less likely) is the association (e.g., low relevancy score).

In further embodiments, the ARP 110A, 110B may display the relevancy scores in the form of a color-coded score as depicted in FIG. 6, after calculating relevancy scores between the textual assertion and the corresponding portion of the source reference. In further embodiments, the machine learning algorithm of the ARP 110A, 110B may be trained to indicate an extent to which content of the source reference and respective ones of the plurality of alternate source references support the textual assertion.

Then, at 308, the ARP 110A, 110B generates a suggested list based on the relevancy scores. According to an example embodiment, the ARP 110A, 110B may display a list of at least one of the source references 508, 606 or the at least one alternate source reference 510, 604 based on the relevancy scores 512 calculated by the machine learning algorithm. The ARP 110A, 110B may rank the source reference and the at least one alternate source reference 510, 604 according to the relevancy scores 512 calculated by the machine learning algorithm and display it to a user using one or more GUI components as depicted in FIG. 5 and FIG. 6. In one illustrated example in FIGS. 5 and 6, the relevancy score 512 may take the form of a bar measure. In another embodiment, the ARP 110A, 110B may display the suggested list and present editing action suggestions including (i) adding a suggested alternate source reference 510, 604, (ii) replacing the citation with an alternative citation to the added alternate source reference 510, 604, or (iii) editing the textual assertion. In addition, the ARP 110A, 110B may allow a user to activate one of the editing action suggestions. In further embodiments, as illustrated in FIG. 6, the action may be uploading, by a user, a further source reference different than any of the source references 508, 606 from the suggested list, where the uploaded further source reference is deemed, by the user, to support the textual assertion.

In some embodiments, as illustrated in FIG. 5, at least a portion of the source/alternate source reference 506 may be visually displayed to the user. The visual display of the source/alternate source reference 506 allows the user to determine the appropriate editing action based on the user's viewing of the displayed content of the source/alternate source reference 506. The user may consider both the relevancy score and the user's own review of the visually displayed source/alternate source reference 506 in the GUI to determine which editing action to take (e.g., reject the source reference, add the source reference in addition to the originally cited source reference, replace the originally cited source reference with the suggested source reference). This is particularly advantageous when the source/alternate source reference 506 takes the form of an image (e.g., JPEG), PDF image, video, or the like.

Next, at 310, the ARP 110A, 110B updates training samples in response to an action by a user. According to an example embodiment, the ARP 110A, 110B may receive a response from the user responsive to the suggested list, such as the user choosing the alternative source reference and add the alternative reference as a training sample. For example, where the source/alternate source reference 506 takes the form of an image (e.g., JPEG), PDF image, video, or the like, the user may rely both on his/her review of the displayed content of the source/alternate source reference 506 as well as the relevancy score determined by the ARP 110A, 110B. In another embodiment, the ARP 110A, 110B may determine the source reference or alternate source reference 510, 604 is a valid source for the corresponding textual assertion responsive to the relevancy score being above a defined threshold. In another embodiment, the ARP 110A, 110B may add the training sample to the plurality of training samples of the machine learning algorithm responsive to the user-uploaded source reference deemed, by the user, to support the textual assertion. Additionally and/or alternatively, the user may provide a 'thumbs down' indication for those suggested alternate source references 508, 606 where the user disagrees with the generated relevancy score 512 or where the user rejects the relevancy of the suggested source reference to the particular assertion. Here too, the ARP 110A, 110B updates the training samples based on the user's 'thumbs down' or rejection indications.

It will be appreciated that the citation auditing system can record metrics relating to the actions of the readers. Actions can be, for instance, the following of a permalink to a cited source document. Metrics include, for instance, the length of time a viewer spent viewing a source document, the number of clicks, or other user engagement metrics. These metrics can be used as an indication of the usefulness of particular source documents by updating the training samples of the machine learning algorithm of the citation auditing system.

It may be appreciated that FIG. 2 and FIG. 3 provide only an illustration of one implementation and does not imply any limitations with regard to how different embodiments may be implemented. Many modifications to the depicted environments may be made based on design and implementation requirements.

Figure 4:
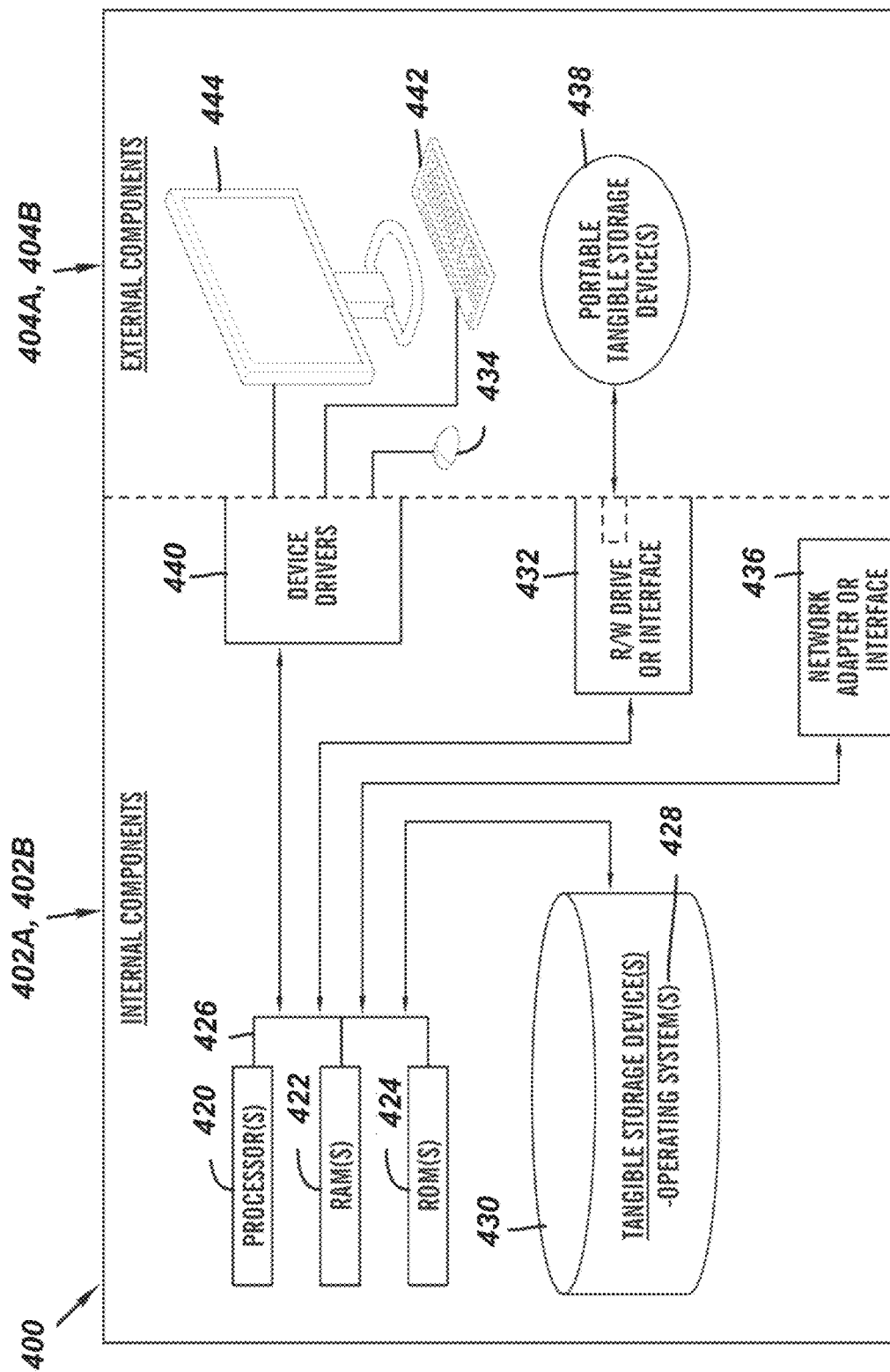
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402A, 402B and external components 404A, 404B illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the auditing references program 110A in the client computing device 102, and the auditing references program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402A, 402B also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the auditing references program 110A, 110B, can be stored on one or more of the respective portable computer-readable tangible storage devices 438, read via the respective RAY drive or interface 432, and loaded into the respective hard drive 430.

Each set of internal components 402A, 402B also includes network adapters or interfaces 436 such as a TCP/IP adapter cards, wireless Wi-Fi interface cards, or 3G, 4G, or 5G wireless interface cards or other wired or wireless communication links. The software program 108 and the auditing references program 110A in the client computing device 102 and the auditing references program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the auditing references program 110A in the client computing device 102 and the auditing references program 110B in the server 112 are loaded into the respective hard drive 430. The network may comprise copper wires, optical fibers, wireless transmission, routers, firewalls, switches, gateway computers and/or edge servers.

Each of the sets of external components 404A, 404B can include a computer display monitor 444, a keyboard 442, and a computer mouse 434. External components 404A, 404B can also include touch screens, virtual keyboards, touch pads, pointing devices, and other human interface devices. Each of the sets of internal components 402A, 402B also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 324).

FIG. 5 depicts a Graphical User Interface (GUI) layout of auditing references process according to an embodiment of the present invention. After the ARP 110A, 110B parses the document, the ARP 110A, 110B may display a page 502 that may show an assertion 504 and associated with the assertion 504 citation 508. The ARP 110A, 110B may display an alternative list of suggestions 510 in an order from a highest score to the lowest, while a user may interact with each of the citation objects 508 and 510 that in response, the ARP 110A, 110B may display the source reference 506 or alternate source reference at a page that is most relevant to the assertion 504.

FIG. 6 depicts a Graphical User Interface (GUI) layout 600 of adding a source document during an auditing references process, according to an embodiment of the present invention. The ARP 110A, 110B may display window 602 when a source document to the citation cannot be determined or when a score between the assertion and the original citation 606 is below a predetermined threshold value. In another embodiment, the ARP 110A, 110B may display a list of suggested citations, where each citation may have a color-coded score 604 that visualizes the score of each suggested citation and the current citation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
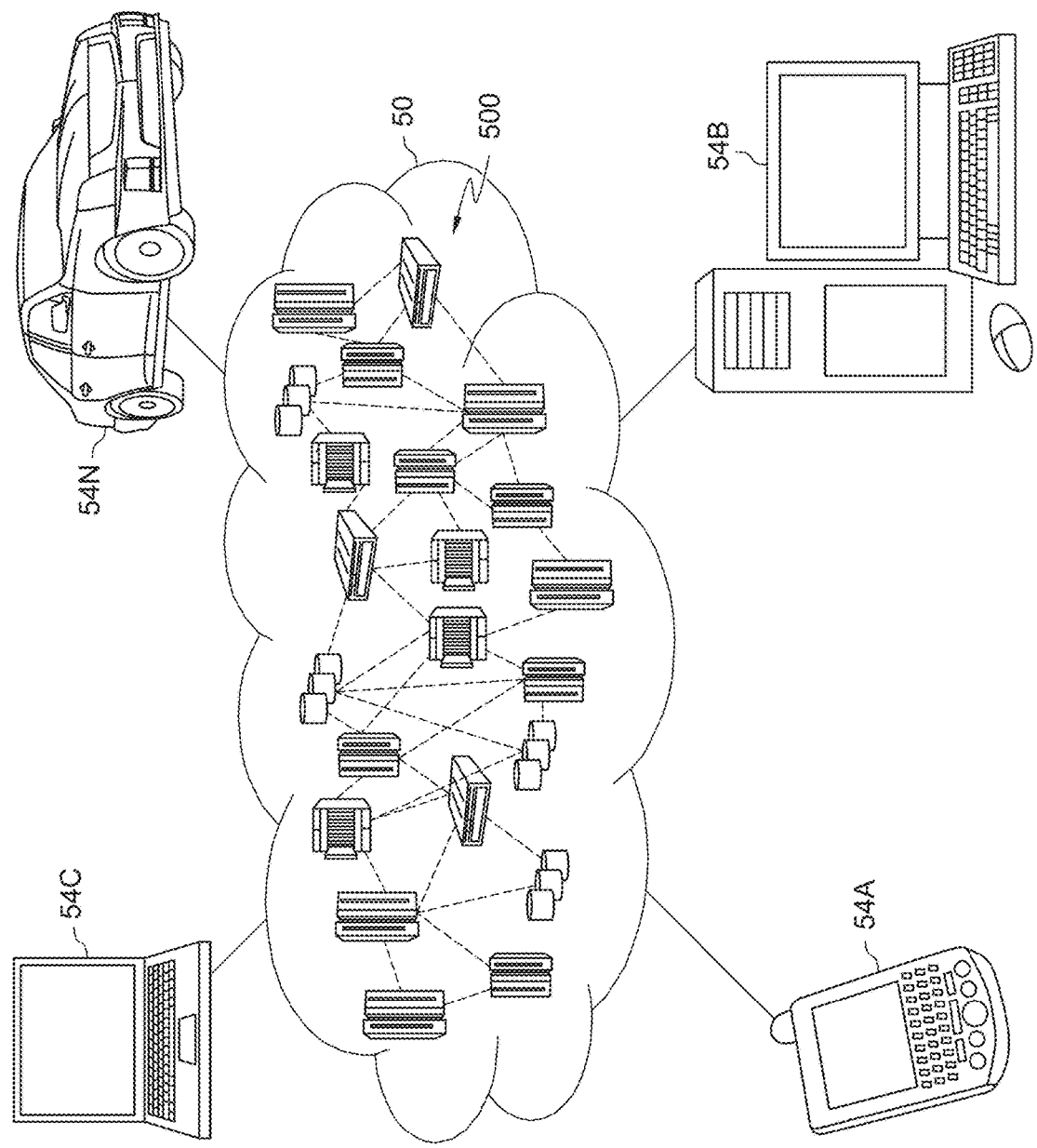
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 100 with which local computing devices used by cloud consumers, such as, for example, mobile phone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 100 and cloud computing environment 50 can communicate with any type of computerized device over any type of network and/or network addressable connection (e.g., using a web browser).

Figure 8:
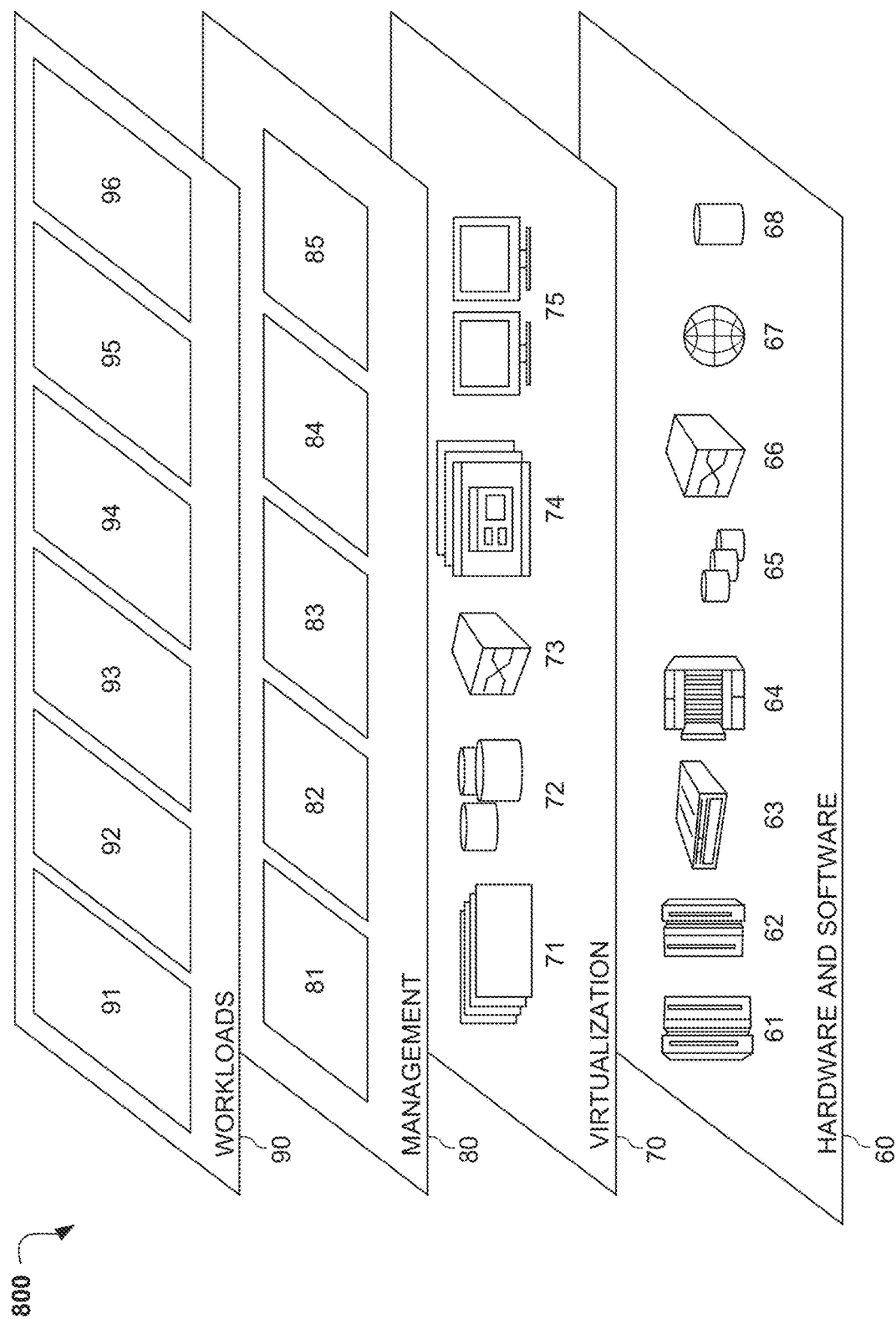
FIG. 8 depicts abstraction model layers according to an embodiment of the present invention.

Referring now to FIG. 8, a set of functional abstraction layers 800 provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and auditing references 96. Auditing references 96 may relate to parsing a document to identify citations and corresponding assertions to each citation in the document and validating that the assertions are valid, based on a suggested list identified by the relevancy scores that were calculated using a machine learning algorithm that may be retrained based on user interactions with the suggested list.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for verifying citations in a document, comprising:
    parsing the document to identify a citation, wherein the citation serves as a pointer to a source reference;
    determining a location in the document of a textual assertion associated with the citation;
    calculating relevancy scores between the textual assertion and a corresponding source reference and between the textual assertion and at least one alternate source reference, wherein the relevancy scores are determined based at least in part on a machine learning algorithm trained with a plurality of training samples;
    generating a suggested list of at least one of the source reference or the at least one alternate source reference based on the relevancy scores calculated by the machine learning algorithm; and
    adding a training sample to the plurality of training samples of the machine learning algorithm in response to an action by a user responsive to the suggested list.

2. The method of claim 1, wherein the machine learning algorithm is a trained binary classifier to determine whether the textual assertion is supported by the source reference or the at least one alternate source reference.

3. The method of claim 1, wherein generating the suggested list comprises ranking the source reference and the at least one alternate source reference according to the relevancy scores calculated by the machine learning algorithm.

4. The method of claim 1, wherein generating the suggested list further comprises presenting editing action suggestions including one or more of (i) adding a suggested alternate source reference, (ii) replacing the citation with an alternative citation to the added alternate source reference, or (iii) editing the textual assertion.

5. The method of claim 4, wherein action by the user comprises the user activating one of the editing action suggestions.

6. The method of claim 1, wherein calculating the relevancy score includes performing a semantic similarity measurement with a distance calculation between vector representations of the textual assertion and one or more of vector representations of the source reference or the at least one source reference.

7. The method of claim 6, further comprising determining the source reference or alternate source reference is a valid source for the corresponding textual assertion responsive to the relevancy score being above a defined threshold.

8. The method of claim 1, wherein calculating relevancy scores between the textual assertion and the corresponding portion of the source reference includes displaying the relevancy scores in the form of a color-coded score.

9. The method of claim 1, wherein verifying citations in the document comprises auditing record documents uploaded by a user.

10. The method of claim 1, wherein parsing the document includes saving results of the parsing into a structured file for further processing, wherein the structured file includes citation categories identifiable with a rule-based text processing to extract known patterns with a text tokenization algorithm.

11. The method of claim 1, wherein the machine learning algorithm is trained to indicate an extent to which content of the source reference and respective ones of the plurality of alternate source references support the textual assertion.

12. The non-transitory computer readable medium of claim 11, wherein parsing the document includes saving results of the parsing into a structured file for further processing, wherein the structured file includes citation categories identifiable with a rule-based text processing to extract known patterns with a text tokenization algorithm.

13. The method of claim 1, wherein the action comprises uploading, by a user, a further source reference different than any of the source references from the suggested list, wherein an uploaded further source reference is deemed, by the user, to support the textual assertion.

14. The method of claim 13, wherein adding the training sample includes adding the training sample to the plurality of training samples of the machine learning algorithm responsive to the user-uploaded source reference deemed, by the user, to support the textual assertion.

15. A non-transitory computer readable medium having a memory with instructions stored therein that when executed by a processor performs a method for auditing a document comprising:
  parsing the document to identify a citation, wherein the citation serves as a pointer to a source reference;
  determining a location in the document of a textual assertion associated with the citation;
  calculating relevancy scores between the textual assertion and a corresponding source reference and between the textual assertion and at least one alternate source reference, wherein the relevancy scores are determined based at least in part on a machine learning algorithm trained with a plurality of training samples;
  generating a suggested list of at least one of the source reference or the at least one alternate source reference based on the relevancy scores calculated by the machine learning algorithm; and
  adding a training sample to the plurality of training samples of the machine learning algorithm in response to action by a user responsive to the suggested list.

16. The non-transitory computer readable medium of claim 15, wherein the machine learning algorithm is a trained binary classifier to determine whether the textual assertion is supported by the source reference or the at least one alternate source reference.

17. The non-transitory computer readable medium of claim 15, wherein generating the suggested list comprises ranking the source reference and the at least one alternate source reference according to the relevancy scores calculated by the machine learning algorithm.

18. The non-transitory computer readable medium of claim 15, wherein generating the suggested list further comprises presenting editing action suggestions including one or more of (i) adding a suggested alternate source reference, (ii) replacing the citation with an alternative citation to the added alternate source reference, or (iii) editing the textual assertion.

19. The non-transitory computer readable medium of claim 18, wherein action by the user comprises the user activating one of the editing action suggestions.

20. The non-transitory computer readable medium of claim 19, further comprising determining the source reference or alternate source reference is a valid source for the corresponding textual assertion responsive to the relevancy score being above a defined threshold.

21. The non-transitory computer readable medium of claim 15, wherein calculating the relevancy score includes performing a semantic similarity measurement with a distance calculation between vector representations of the textual assertion and one or more of vector representations of the source reference or the at least one source reference.

22. The non-transitory computer readable medium of claim 15, wherein calculating relevancy scores between the textual assertion and the corresponding portion of the source reference includes displaying the relevancy scores in a form of a color-coded score.

23. The non-transitory computer readable medium of claim 15, wherein auditing a document comprises auditing record documents uploaded by a user.

\* \* \* \* \*